United States Patent [19]

McCracken

[11] 4,218,323

[45] Aug. 19, 1980

[54] PELLET FREE ROTOR FOR CENTRIFUGAL PELLET DRYERS

[75] Inventor: David A. McCracken, Winfield, W. Va.

[73] Assignee: Gala Industries, Inc., Eagle Rock, Va.

[21] Appl. No.: 932,336

[22] Filed: Aug. 9, 1978

[51] Int. Cl.[2] .......... B01D 29/00

[52] U.S. Cl. .......... 210/415; 34/59; 34/179; 366/279

[58] Field of Search .......... 34/59, 126, 166, 173, 34/179, 180, 181, 185, 184, 186, 58; 366/279, 65, 66, 67; 210/383, 394, 403, 380, 415

[56] References Cited

U.S. PATENT DOCUMENTS

| | | | |
|---|---|---|---|
| 575,983 | 1/1897 | Perky | 34/179 X |
| 584,195 | 6/1897 | Robinson et al. | 210/415 |
| 752,882 | 2/1904 | Barbeau | 210/394 X |
| 3,255,883 | 6/1966 | Nelson et al. | 210/415 X |
| 3,256,994 | 6/1966 | Koelsch | 210/380 X |
| 3,458,045 | 7/1969 | Dudley | 210/415 X |
| 3,798,789 | 3/1974 | Thompson | 34/126 X |
| 4,140,402 | 2/1979 | McAllister, Jr. | 366/279 |

FOREIGN PATENT DOCUMENTS

| | | | |
|---|---|---|---|
| 46154 | 3/1889 | Fed. Rep. of Germany | 34/185 |
| 1201773 | 9/1965 | Fed. Rep. of Germany | 34/181 |
| 56523 | 2/1912 | Switzerland | 366/65 |

*Primary Examiner*—Albert J. Makay
*Assistant Examiner*—Harold Joyce
*Attorney, Agent, or Firm*—Clarence A. O'Brien; Harvey B. Jacobson

[57] ABSTRACT

Lifter blades are mounted for rotation by a rotor assembly within a foraminous housing to centrifugally dry pellets impelled upwardly through the housing by the blades. Accumulation of pellets on the rotor is minimized by elimination of vertical entrapping surfaces in favor of spokes made of vertically positioned flat bars from which blade attachment arms extend at obtuse angles.

13 Claims, 4 Drawing Figures

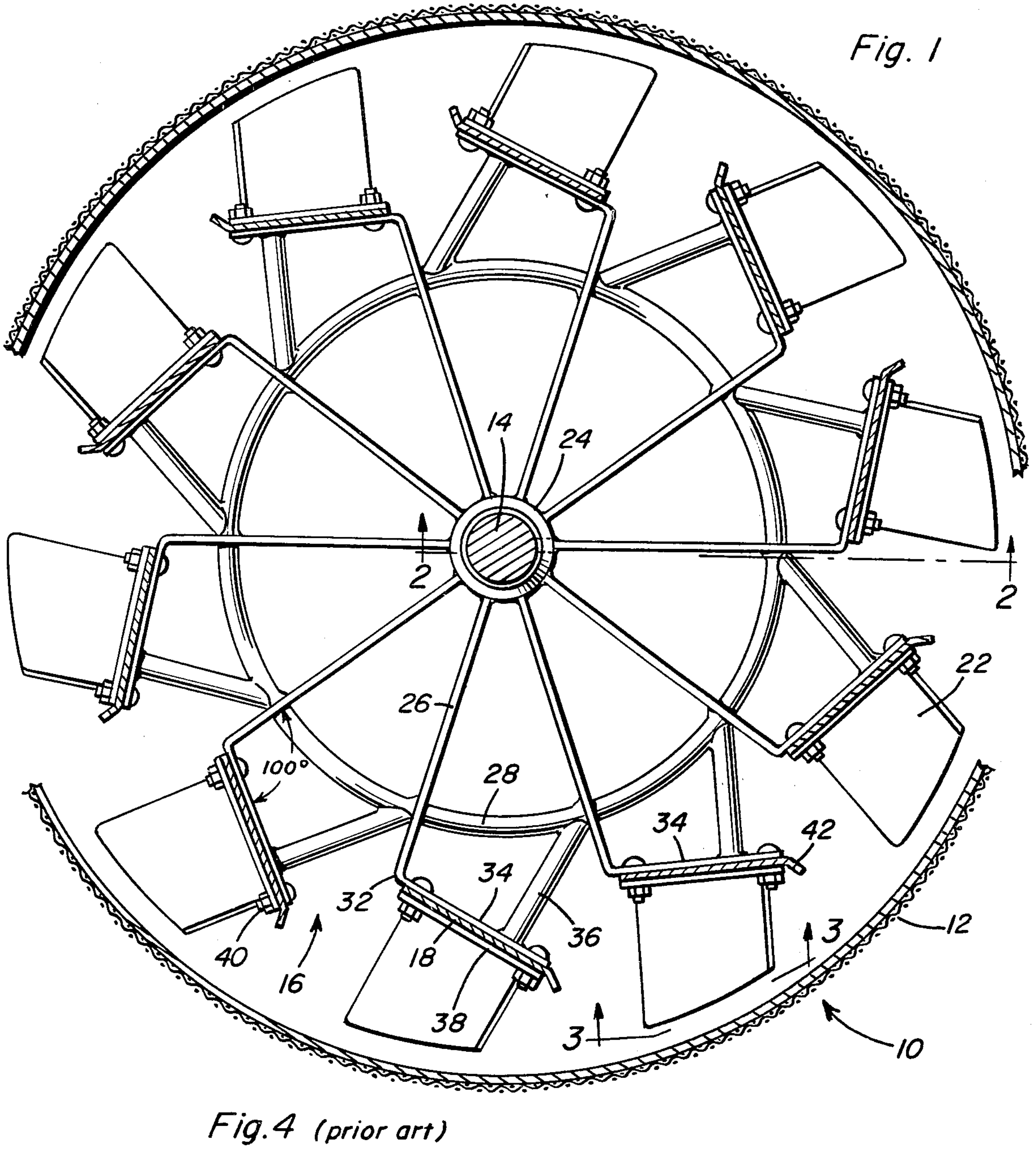
Fig.4 (prior art)
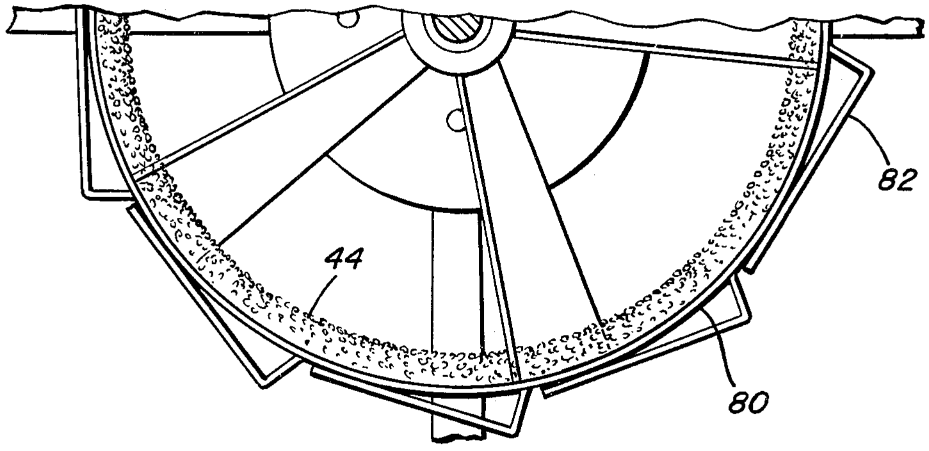

PELLET FREE ROTOR FOR CENTRIFUGAL PELLET DRYERS

BACKGROUND OF THE INVENTION

This invention relates to improvements in centrifugal pellet dryers and more particularly to the blade mounting rotor construction associated with such dryers.

The improvement of the present invention relates to pellet drying rotor assemblies of the type disclosed in U.S. Pat. No. 3,458,045 to Dudley, owned in common by the assignee of the present application. In such prior patented dryer, the rotor assembly mounts lifter blades which impel pellets upwardly through a cyiindrical, foraminous housing from which water is centrifugally discharged. The rotor construction is such, however, that pellets become entrapped by centrifugal force on vertical surfaces. The pellet build-up on such surfaces causes cross-contamination and rotor unbalance.

It is therefore an important object of the present invention to provide a rotor construction which will avoid pellet accumulation by centrifugal force on vertical entrapping surfaces, without sacrificing rotor strength and rigidity.

SUMMARY OF THE INVENTION

In accordance with the present invention, the rotor is assembled from spider sections formed by flat bar spokes extending radially from power shaft hubs in vertical planes and interconnected by cross-sectionally round annular elements located between the hubs and blade attachment arms extending at obtuse angles from the radially outer ends of the spokes. Vertically aligned attachment arms of the spider sections are interconnected by vertically elongated blade carrier plates from which lifter blades extend radially outward to impel pellets upwardly along an annular zone within the housing adjacent its outer foraminous cylindrical wall through which water is centrifugally discharged. Backing struts extend from the attachment arms to the annular elements at the intersection of the spokes therewith to maintain the desired angular relationship between the attachment arms and the spokes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top sectional view of an installed rotor assembly constructed in accordance with the present invention.

FIG. 4 is a partial top sectional view of a prior art rotor assembly showing the problem associated therewith.

DETAILED DESCRIPTION OF A PREFERRED EMBODIMENT

Figures 2, 3:
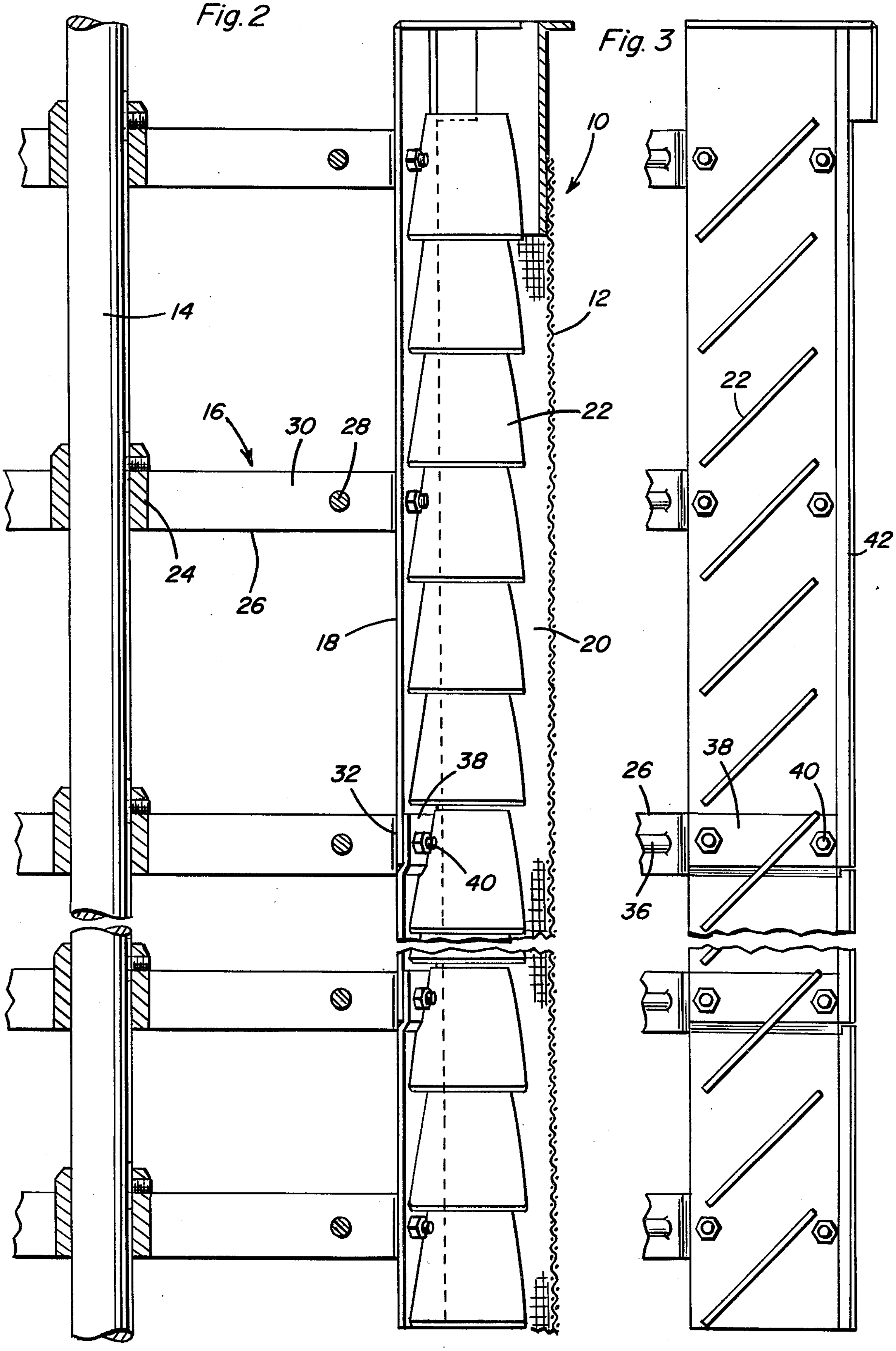
FIG. 2 is a partial side sectional view taken substantially through a plane indicted by section line 2—2 in FIG. 1.
FIG. 3 is a partial side elevational view as seen from a plane indicated by section line 3—3 in FIG. 1.

Referring now to the drawings in detail, FIGS. 1, 2 and 3 illustrate a portion of the pellet drying apparatus of the type disclosed in U.S. Pat. No. 3,458,045 aforementioned, including a vertically positioned housing 10 formed by a cylindrical wall 12 made of foraminous material such as metal screening. The housing encloses a rotor assembly driven through a power shaft 14 that extends centrally through the housing. A plurality of vertically aligned spider sections 16 are connected to the power shaft through which rotational planes extend perpendicular to the power shaft. The spider sections are interconnected in circumferentially spaced relation by overlapping blade carriers 18 to define a radially outer zone 20 adjacent the foraminous wall 12 of the housing through which pellets are impelled upwardly by lifter blades 22. The blades 22 extend outwardly from the carriers 18 at an angle to the rotational planes extending through the spider sections.

As more clearly seen in FIGS. 1 and 2, each spider section 16 includes a hub 24 secured to the power shaft, from which a plurality of flat bar spokes 26 extend. The spokes are interconnected by an annular stabilizer element 28 holding the spokes in fixed angularly spaced relation to each other. The annular element 28 intersects the vertically positioned side surfaces 30 of the flat bar spokes between the hub and the radially outer ends 32 of the spokes. As more clearly seen in FIG. 2, the annular stabilizer element 28 is round in cross section. Each spoke 26 has an attachment arm 34 extending from the end 32 at an obtuse angle such as 100 degrees from the vertical plane with which the spoke is aligned as shown in FIG. 1. This obtuse angular relationship is maintained by a backing strut 36 which extends rearwardly from each attachment arm substantially perpendicular thereto and is secured to the annular element 28 substantially at its intersection with an adjacent spoke 26. The struts 36 are also round in cross section.

The blade carriers 18 are vertically elongated plates, the lower ends of which overlap the offset upper end portions 38 of adjacent carriers. The lifter blades 22 extend outward from the carrier plates 18 at an angle such as 45 degrees to the rotational planes extending through the annular elements 28 of the spider sections. Removable screw and nut fasteners 40 interconnect the overlapping end portions of the blade carriers to each other and to a spider section aligned therewith through its attachment arms 34. Additional fasteners interconnect the attachment arms of other spider sections to the blade carriers intermediate the ends thereof. A rigid bladed rotor assembly is thereby formed with the lifter blades positioned within the radially outer zone 20. Longitudinal flanges 42 extend at an angle from the carriers 18 along the vertical edge thereof remote from the spokes.

As seen in FIG. 4, showing a prior art rotor assembly of the type disclosed in U.S. Pat. No. 3,458,045 aforementioned, pellets 44 are centrifugally held on the vertical rim 80 of the rotor to which the lifter blades are attached by elements 82. Such a build-up of pellets within the rotor during rotation often causes imbalance. By eliminating vertical entrapping surfaces, the pellet build-up is avoided. Thus, the spokes 26 in accordance with the present invention are flat bars positioned along vertical and radial planes to prevent accumulation of pellets thereon. The outer rims of the prior art rotor is replaced by the cross-sectionally round stabilizer elements 28 and blade attachment arms 34 extending at an obtuse angle to the spokes so that centrifugal force will direct pellets impinging thereon, radially outward off the outer flanges 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vertical housing made of foraminous material, a rotor assembly enclosed therein having a power shaft, a plurality of lifter blades, and means mounting the blades on the rotor assembly for impelling pellets vertically upward and radially outward while centrifugally discharging liquid through the foraminous material, said rotor assembly being constructed to prevent accumulation of pellets thereon during rotation, comprising a plurality of vertically aligned spider sections secured to the power shaft and interconnected by the blade mounting means in radially spaced relation to the power shaft, each of said spider sections including a plurality of spokes secured to the power shaft, an attachment arm extending from each of the spokes in one directional sense at an obtuse angle in a horizontal plane perpendicular to said power shaft, fastener means for securing the blade mounting means to said attachment arms and stabilizer means interconnecting said spokes radially between the power shaft and the attachment arms for holding the spokes aligned with said horizontal plane in fixed angularly spaced relation to each other.

2. The combination of claim 1 wherein said blade mounting means includes vertically elongated carrier plates from which the blades project outward at an angle to the power shaft, said carrier plates being secured by the fastener means in bridging relation to vertically adjacent spider sections.

3. The combination of claim 2 wherein each of said spokes is a flat bar having side surfaces, said side surfaces being positioned substantially parallel to vertical planes intersecting the power shaft in radial relation thereto.

4. The combination of claim 3 wherein said stabilizer means includes an annular element intersecting the side surfaces of the flat bars, said element being substantially circular in cross-section.

5. The combination of claim 4 including backing struts extending from the attachment arms to the stabilizer means at the intersection thereof with the spokes.

6. The combination of claim 1 wherein each of said spokes is a flat bar having side surfaces, said side surfaces being positioned substantially parallel to vertical planes intersecting the power shaft in radial relation thereto.

7. The combination of claim 1 wherein said stabilizer means includes an annular element intersecting the spokes, said element being substantially circular in cross-section.

8. The combination of claim 7 including backing struts extending from the attachment arms to the stabilizer means at the intersection thereof with the spokes.

9. In combination with a rotor assembly enclosed within a vertical foraminous housing, pellet impelling blade means for impelling pellets radially outward and vertically upward and a power shaft, said rotor assembly being constructed to prevent accumulation of pellets thereon during rotation relative to the housing, including a plurality of spokes secured to the power shaft, an attachment arm extending from each of the spokes in one directional sense only at an obtuse angle in a horizontal plane perpendicular to said power shaft, fastener means for securing the blade means to said attachment arms and stabilizer means interconnecting said spokes radially between the power shaft and the attachment arms for holding the spokes aligned with said horizontal plane in fixed angularly spaced relation to each other.

10. The combination of claim 9 wherein each of said spokes is a flat bar having side surfaces, said side surfaces being positioned substantially parallel to vertical planes intersecting the power shaft.

11. The combination of claim 10 wherein said stabilizer means includes an annular element intersecting the spokes, said element being substantially circular in cross-section.

12. The combination of claim 11 including backing struts extending from the attachment arms to the stabilizer means at the intersection thereof with the spokes.

13. In a pellet drying apparatus having a vertical cylindrical housing made of foraminous material through which water is discharged by rotation of a rotor assembly enclosed therein, said rotor assembly enclosed therein, said rotor assembly comprising lifter blade means for impelling pellets vertically upward through the housing, a power shaft, and spider means secured to the power shaft for support of the blade means within the housing, said spider means including a plurality of radial spokes secured to the power shaft, an attachment arm extending from each of the spokes in one directional sense only at an obtuse angle in a horizontal plane perpendicular to said power shaft, fastener means for securing the blade means to said attachment arms and stabilizer means interconnecting said spokes radially between the power shaft and the attachment arms for holding the spokes aligned with said horizontal plane in fixed angularly spaced relation to each other.

* * * * *